United States Patent [19]

White et al.

[11] Patent Number: 5,690,844
[45] Date of Patent: Nov. 25, 1997

[54] POWDER FEED FOR UNDERWATER WELDING

[75] Inventors: Raymond Alan White, Schenectady; Robert Anthony Fusaro, Jr., Cobleskill; Dennis Michael Gray, Delanson, all of N.Y.

[73] Assignee: General Electric Company, Schenectady, N.Y.

[21] Appl. No.: 701,930

[22] Filed: Aug. 26, 1996

[51] Int. Cl.$^6$ ............................................. B23K 10/00
[52] U.S. Cl. .......................... 219/121.47; 219/121.45; 219/121.46; 219/73.21; 219/76.16; 239/85; 427/446; 118/308
[58] Field of Search ............ 219/72, 73.2, 73.21, 219/76.15, 76.16, 121.47, 121.45, 121.46; 239/11, 85; 427/446, 459, 569, 535; 118/308

[56] References Cited

U.S. PATENT DOCUMENTS

| | | | |
|---|---|---|---|
| 3,627,965 | 12/1971 | Zweig | 219/76.16 |
| 3,839,618 | 10/1974 | Muehlberger | 219/76.16 |
| 4,391,860 | 7/1983 | Rotolico et al. | 427/423 |
| 4,696,855 | 9/1987 | Pettit, Jr. et al. | 427/426 |
| 4,901,921 | 2/1990 | Dallaire et al. | 239/11 |
| 5,047,612 | 9/1991 | Sarkar et al. | 219/121.47 |

*Primary Examiner*—Mark H. Paschall
*Attorney, Agent, or Firm*—Ernest G. Cusick; William H. Pittman

[57] ABSTRACT

An apparatus and method feeds weld material to an underwater plasma transferred arc welding torch. The weld material comprises a powder, which can be entrained in a fluidizing gas flow. The weld material is fed by the apparatus from a first supply through at least one conduit to a supply container. The apparatus comprises a first powder supply pressurized with a powder carrier gas positioned above the surface of the body of water; a second powder supply container positioned below the surface of the body of water and the second powder supply container comprising at least one powder outlet port and a gas vent open to the above surface atmosphere; at least one powder conduit connecting the first container with the second container; an underwater welding torch positioned near the second container and having at least one powder inlet; and at least one powder conduit connecting the second powder supply container to the at least one powder inlet of the torch. The method of underwater welding includes transferring of weld filler powder from the underwater supply container to the torch at a reduced flow rate by venting at least a portion of the carrier gas to the atmosphere above the surface of the body of water.

10 Claims, 4 Drawing Sheets ns, 5,690,844

POWDER FEED FOR UNDERWATER WELDING

FIELD OF THE INVENTION

The present invention relates to plasma transferred arc welding and to a welding system which includes a powder delivery system for supplying powdered metal from a remote powder feed hopper for welding or cladding metal articles and more particularly to underwater welding and cladding using a metal powder supplied from a remote source located above the water surface.

BACKGROUND OF THE INVENTION

The manufacture and repair of many types of devices and structures requires the joining of metal parts. Soldering, brazing, and welding are familiar generic techniques for attaching metal parts to each other. Of these, welding is unique in raising localized regions of the parts to temperatures above the melting point of the constituent metals, with or without the addition of filler metal, allowing the metals to flow together so as to form a unitary body.

For example, it is often necessary to perform welding under water or other fluid for repair of hulls of ships or in heat transfer systems using a liquid as a medium of heat exchange. Underwater welding generally uses an arc induced plasma with or without a pressurized gas flow to exclude the liquid from the immediate vicinity of the weld. However, an exclusion region which is necessary to protect an arc or a flame of the welding torch providing the welding heat, and the resultant weld pool, is difficult to maintain by gas against hydrostatic pressures which occur at substantial depths.

Use of a remote powder source for delivering powdered filler metal welding and cladding materials for underwater welding requires use of a long conduit relative to standard welding and cladding operations in which the powder hopper is close to the welding torch. The friction association with distance of travel in the conduit and the back pressure associated with the head of water makes it difficult to supply metal powder to the torch. To overcome the frictional force and the water head back pressure it is necessary to increase the carrier gas flow rate and pressure. Increased pressure and flow rate disrupt the plasma arc and result in poor welds.

SUMMARY OF THE INVENTION

In one aspect, this invention provides an apparatus for underwater welding comprising a first powder supply container pressurized with a powder carrier gas positioned above the surface of a body of water; a second powder supply container positioned below the surface of the body of water and having at least one powder outlet port and a gas vent open to the above surface atmosphere; at least one powder conduit connecting the first container with the second container; an underwater welding torch positioned near the second container and having at least one powder inlet; and at least one powder conduit connecting the second powder supply container to the powder inlet of the torch.

More particularly the underwater welding apparatus comprises a plasma transferred arc welding torch adapted for operation underwater and having at least one powder inlet port; a first powder supply container positioned above the surface of a body of water and being connected to a high flow rate source of carrier gas and at least one powder outlet port; a second powder supply container positioned below the surface of the body of water, having a carrier gas vent open to the atmosphere above the surface of the body of water and having at least one powder inlet port and at least one powder outlet port; and powder supply conduits connecting the first container with the second container and the second container to the welding torch.

In another aspect, the invention provides an underwater welding powder supply container for receiving powder and carrier gas at a high flow rate from a carrier gas pressurized remote source and transferring the powder to a nearby underwater welding torch at a reduced flow rate comprising a powder chamber, a powder receiving inlet communicating with the powder chamber, at least one powder outlet communicating with the powder chamber and the nearby underwater welding torch, and atmospheric vent means communicating with the powder chamber and the atmosphere.

In another aspect, the invention provides a method of underwater welding which comprises the steps of delivering welding powder entrained in a carrier gas at a high flow rate from a remote source located above the surface of a body of water to an underwater powder supply container located in proximity to the welding torch and then transporting welding powder from the underwater supply container to the torch at a reduced flow rate by venting at least a portion of the carrier gas to the atmosphere above the surface of the body of water.

An object of the present invention is to provide a technique for welding and cladding metals and alloys by plasma transferred arc using a remote powder feed hopper and increased carrier gas flow rates and pressure needed to bring the powder from the remote hopper to the weld without disrupting the plasma arc.

The invention provides an apparatus and method for making welds under water or other fluid without distortion of the weld bead and with reliable and uniform delivery of welding material to the weld in a powdered form.

In accordance with a further aspect of the invention, a method and apparatus for welding is provided comprising the steps of or arrangements for transporting powdered welding filler material from a remote feed hopper at the weld site with a flow of transport gas, venting a portion of transport gas, venting a portion of the transport gas from the hopper, and feeding the powdered material from the hopper to the welding torch.

To serve its purpose, the underwater cladding process has to operate remotely up to about 100 feet away from the surface to be clad, and under about 80 feet of water. The distance of travel, and the back pressure associated with the water head presents a problem in the ability to feed filler metal powder to the torch. To overcome the water head back pressure and the frictional forces associated with powder feed line lengths, we must increase powder carrier flows and pressures. The result of the increased carrier gas flow rates and pressure is disruption of the plasma arc, as evidenced by the formation of poor weld beads. As the flow rate is increased, the gas flow from the two powder ports, integral to the torch nozzle and adjacent to the plasma orifice in the center of the nozzle, impinge on the plasma plume and distort its shape. The result is that the powder will reach the work plate, but the weld is distorted. If the flow rate is increased further, the weld divides into two separate parallel beads. It is believed that the shape of the plasma arc is being distorted and ultimately split by the higher flow rates.

This invention overcomes these problems by delivering powder from a remote powder hopper located above the surface of the water pool using a gas flow rate sufficient to transport the powder to a gravity feed powder distribution hopper located close above the torch and venting the excess gas flow from the torch feed hopper so that powder is fed to the torch.

The invention overcomes this problem by providing a second powder feed hopper in close proximity to the underwater welding torch in which the high flow rate and pressure of the carrier gas is reduced to the level of the gas flow rate and pressure at the site of the weld. This is accomplished by venting the second powder feed hopper to the atmosphere and controlling the extent of venting to maintain pressure in the second hopper at about the level of pressure at the weld site within the exclusion device. The second powder feed hopper is referred to hereafter as the torch feed hopper.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE INVENTION

The underwater welding system of this invention includes a high pressure remote powder feed hopper from which the weld material is delivered to the torch feed hopper located beneath the surface of the body of water. It also includes a plasma transferred arc welding torch fitted with a water exclusion device which protects the arc from the ambient water. The torch feed hopper is provided with flow and pressure relief means for venting at least a portion of the carrier gas pressure to the atmosphere without interrupting the flow of powder to the torch.

In general, a plasma torch usually includes a central electrode of a high-temperature resistant material such as tungsten surrounded by an electrode, of generally annular form. The remainder of the torch is arranged to direct a high-pressure flow of inert gas at substantial volume through the gap between the central electrode and the annular electrode which will ionize forming a plasma when an arc is struck between them. A gas flow around the outer periphery of the annular electrode also provides for protection of the work piece. The plasma flow to the work piece is enhanced by the use of a gas lens which focuses the gas flow. The inert gas flow causes the plasma to extend outwardly from between the electrode to transfer heat to a surface to be heated for welding or cladding.

A plasma transferred arc torch operates in much the same manner but utilizes the surface to be heated as an electrode instead of the annular electrode of the plasma torch as described above. The arc is struck between the central electrode and the surface to be heated. The plasma is transferred to the surface. The inert gas flow serves the same function of supplying ionizable gas to the arc for formation of the plasma and to protect the arc as well as the molten material of the weld and the tungsten electrode. In underwater welding, the inert gas assists in formation and maintenance of the exclusion region.

Figure 1:
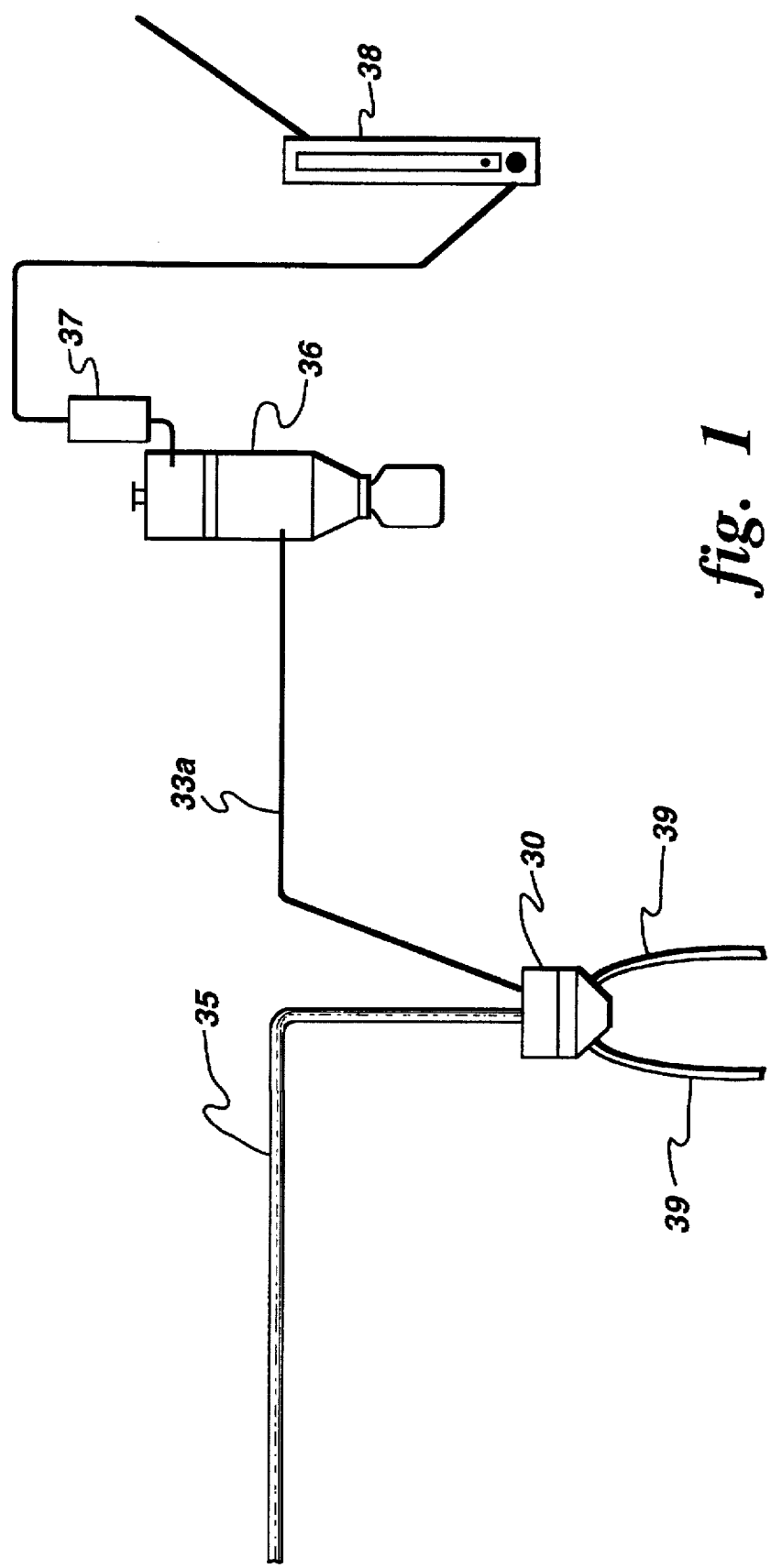
FIG. 1 is an overall view of a powder material delivery system.

The overall powder transport system is shown in FIG. 1. Powder weld filler material is transported to torch feed hopper 30 entrained in inert gas at high pressure and flow rate through hose 35. The vented carrier gas, which may contain some amount of powder is carried by pressure relief line 33a to a powder collector 36. Separation of residual powder from the gas may be enhanced by inclusion of a baffle. For safety, an over pressure relief valve may also be provided and will achieve the additional function of preventing excessive gas pressure build-up in torch feed hopper 30. Separated gas is allowed to flow from the upper portion of powder separator and collector 36 through a water vapor filter 37 and a flow meter 38. This difference between transport flow and exhaust gas flow can be delivered to the torch to assist in powder delivery and maintenance of the exclusion region.

Figure 2:
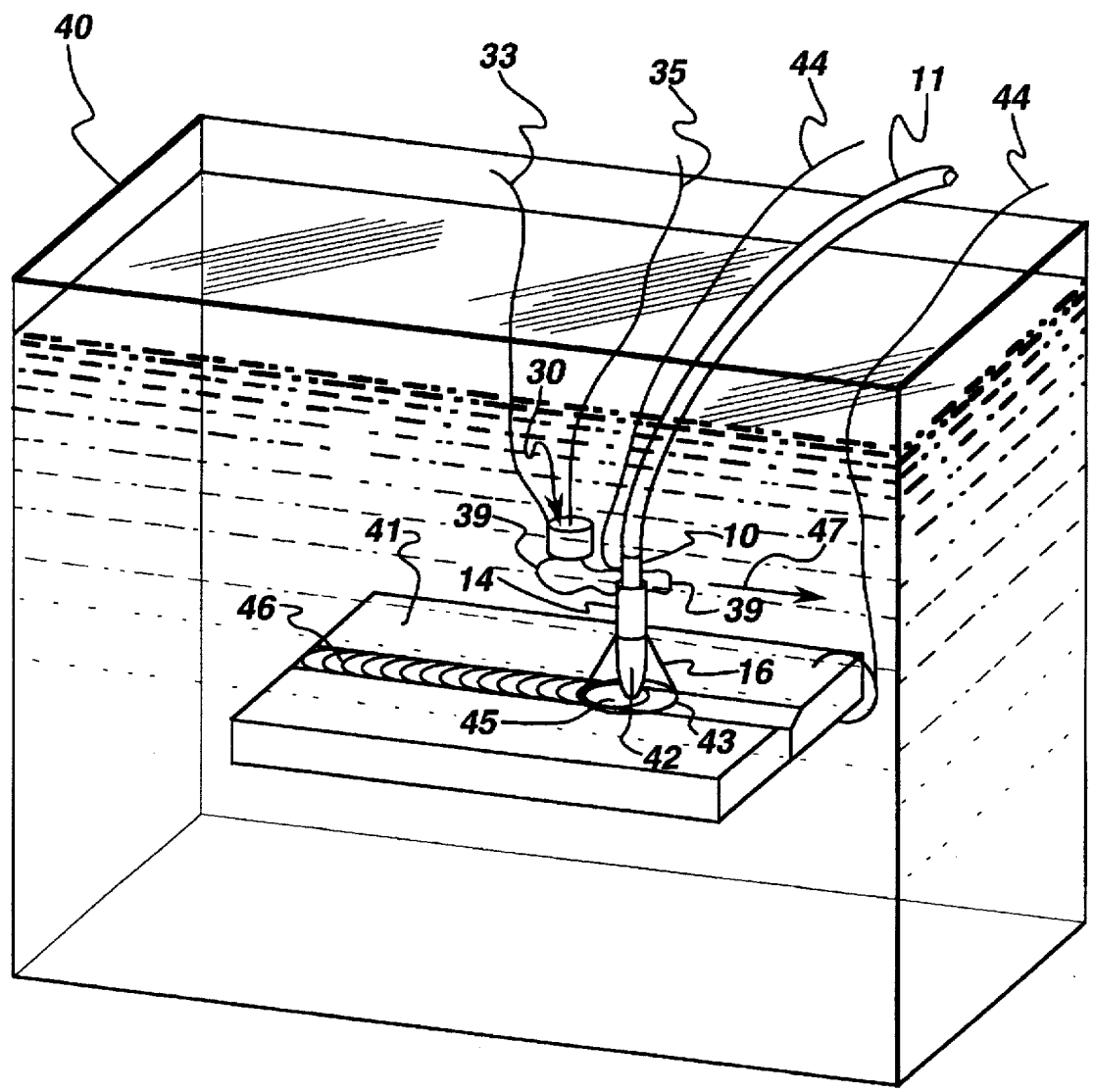
FIG. 2 illustrates an underwater welding system using the invention.

FIG. 2 illustrates the making of an underwater weld using the system of the invention. The submerged welding is schematically depicted by a fluid-containing tank 40. The torch 10 with inert gas supply line 11, gas lens 14, and exclusion fitting 16 are shown assembled and located adjacent the surface of substrate 41 at which the weld is to be made. The plasma 42 extends to that surface. Weld material is supplied through hose 35 to torch feed hopper 30. Powdered weld material is transported from the torch feed hopper 30 to torch 10 through hoses 39. A plasma transferred arc torch being assumed, electrical power is supplied to the torch 10 and workpiece 41 through electrical connections 44. Excess gas pressure and flow rate is vented by hose 33.

To make a weld, inert gas such as argon, is supplied through hose 11 to develop an exclusion region within exclusion fitting 16. An arc is struck in torch 10 which supplies heat to surface 41 and develops a pool of molten metal 45 to which powdered weld filler material is added through hoses 39. The torch is then moved in the direction indicated by arrow 47 with the weld bead 45 trailing behind the plasma 42. The size of the exclusion region is chosen to be slightly more than the length of the weld pool 45 so that the weld will be quenched almost immediately after the onset of solidification.

Figure 3:
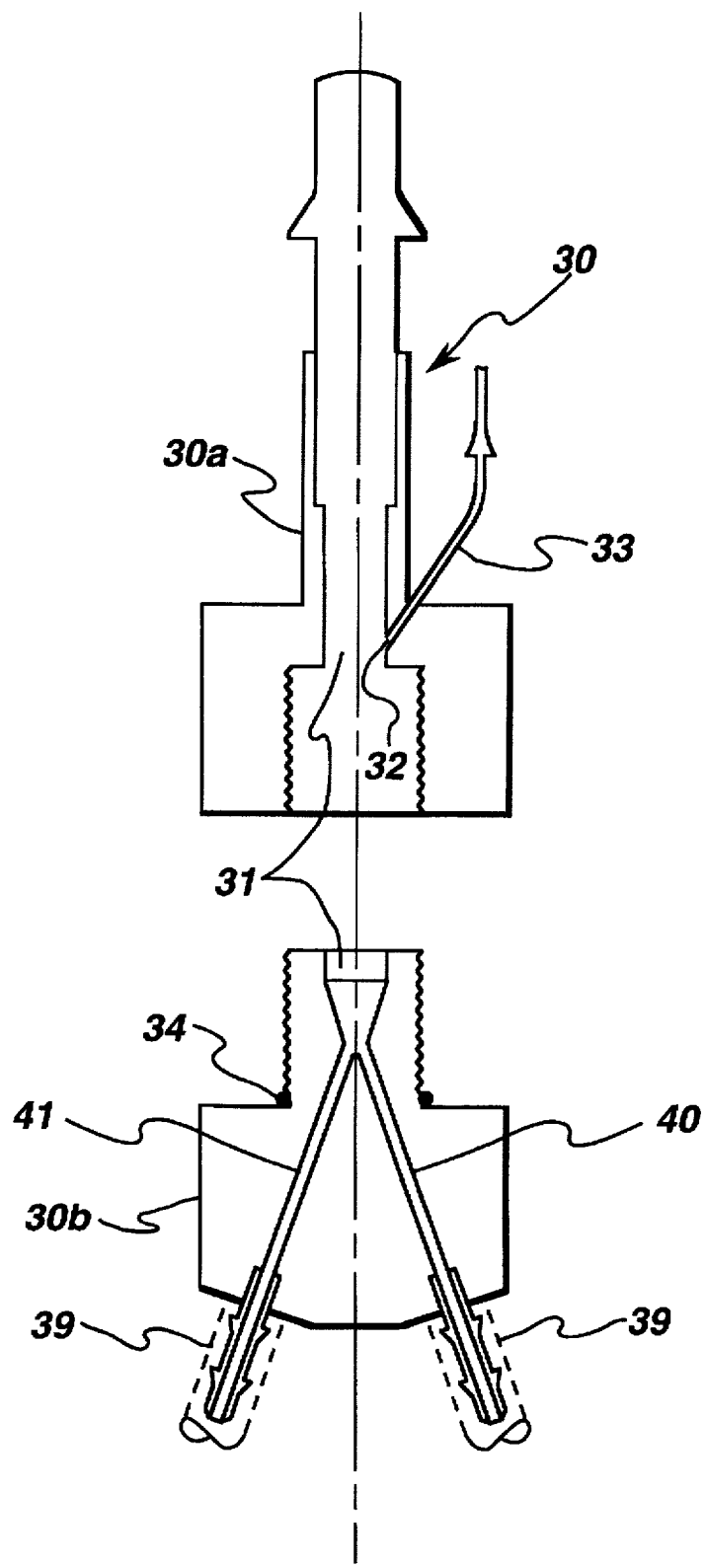
FIG. 3 is an exploded cross section view of a portion of the torch feed hopper which includes the supply line from the remote hopper, the pressure relief means and the feed chamber.

FIG. 3, shows one embodiment of a torch feed hopper 30. The structure of the hopper 30 is similar to fittings such as would normally be mounted at the bottom of a gravity fed powder hopper which would be located about three feet or less above the torch during welding. Such a fitting can be modified by enlarging the inner cavity 31 and providing a hole 32 in the supply side of the fitting to which a tube or hose 33 is attached. Both of these modifications are facilitated by making the hopper 30 in two sections 30a, 30b preferably threaded to each other and sealed with an O-ring seal 34, as shown. This torch feed hopper is mounted close above the torch and powder is fed to the torch through hoses 39 attached to barbed fittings on the lower end of the hopper 30. Two such hoses are preferred as a matter of convenience in adapting this feature of the invention to existing torches which utilize the surface welding gas transport technique described above. More or fewer such outlets could be provided, as desired or may be found convenient by those skilled in the art.

By the use of the torch feed hopper 30, a controlled amount of the powder transport gas flow can be released through hole 32 and tube or hose 33, allowing a much higher gas flow rate to be used to carry the powder from a remote above surface powder supply to the torch feed hopper transport. It is desirable for a relatively small volume of carrier gas to pass from the torch feed hopper to the torch to facilitate powder delivery to the torch. In any case, the volume and velocity of gas forced into the nozzle may be readily reduced to levels which do not significantly distort the heat source and allow a single bead weld to be formed. It should also be understood that the principle of bleeding off of additional gas flow used to facilitate powder transport can be applied to a hopper of any size. However, a small size hopper mounted near or on the torch is preferred since it has the advantages of accommodating close clearances to the weld location, greater potential reduction of gas flow to the torch consistent with good powder feed, and capability of being constructed to withstand high internal and external pressures without requiring large amounts of material or special structures. The small size is particularly convenient since existing hardware can be modified as described above to provide the function of improved powder feed without significant distortion of the heat source.

Figure 4:
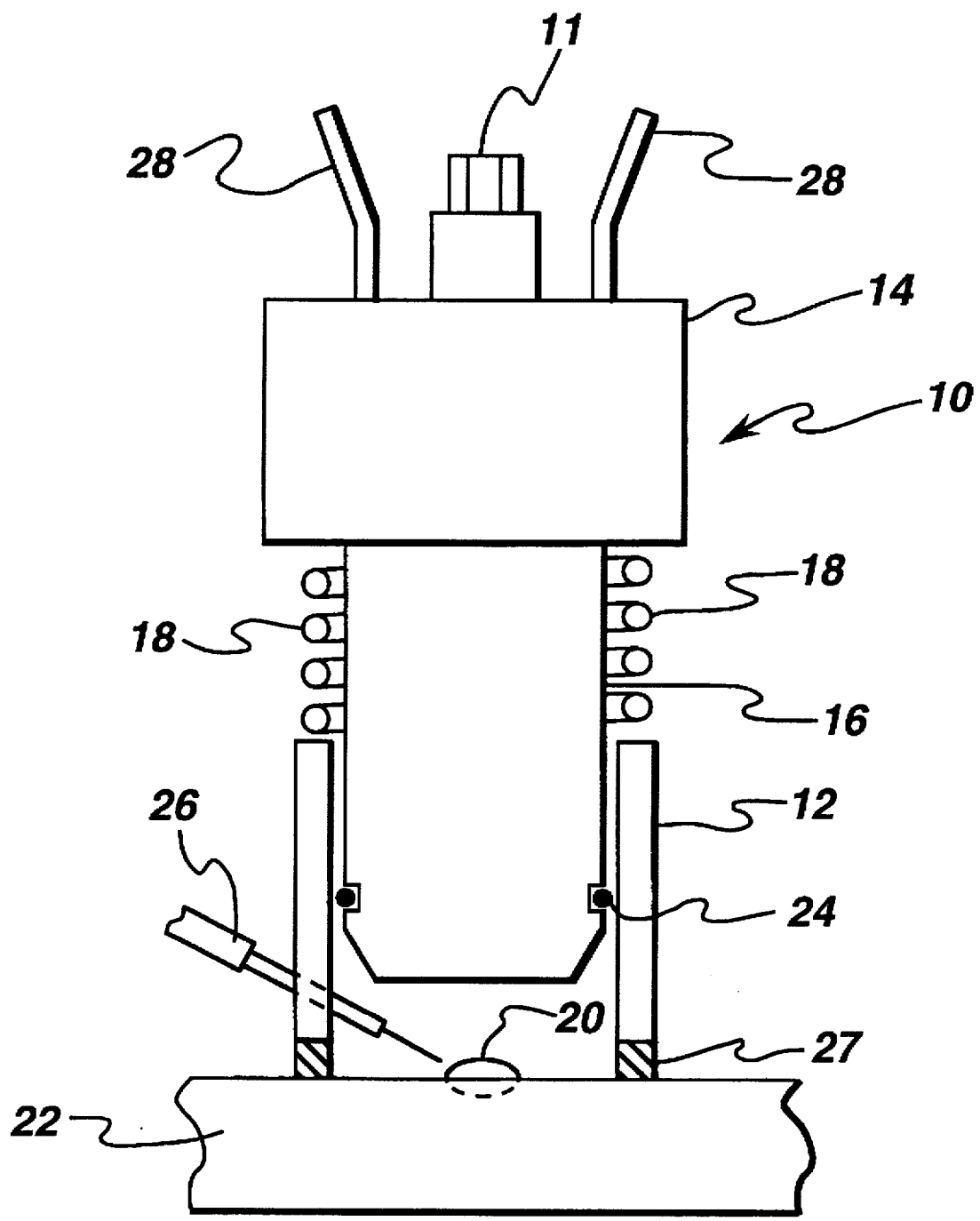
FIG. 4 is an exploded cross-sectional view of a torch and water exclusion fitting providing a liquid exclusion zone.

FIG. 4 shows a plasma transferred arc torch 10 is provided with power, water and gas inlet connections. The gas is generally divided into a so-called plasma center gas flow around a central electrode 11 for supplying gas to the plasma and a so-called shielding gas flow which is intended to displace ambient gases or liquids and to refine the perimeter of the plasma. These gas flows are modified and directed in the immediate vicinity of the arc plasma by a gas lens 16. Welding filler material in the form of a powder is introduced into the torch at inlets 28. Exclusion fitting 12 is located below the gas lens, or can be attached directly to a torch without a gas lens. The body of the water exclusion fitting 12 is shown as cylindrical but can be any other convenient shape. The diameter of the water exclusion device is sufficient to provide an exclusion region having a diameter slightly larger than about twice the length of the weld pool. Water exclusion device 12 is provided with a surface compliant skirt 27 which may be formed metal mesh or fibers welded to body 12.

The escape of gases though the spaces between wires or fibers displaces liquids which would otherwise be forced into the exclusion zone by hydrostatic pressure. The confinement of the gas by exclusion fitting 12 allows an exclusion zone to be maintained with reduced gas flow volume by maintaining a pressure in excess of the ambient hydrostatic pressure.

It should also be understood that while the exclusion zone can be maintained by a combination of the plasma center gas and the shielding gas, possibly supplemented to some degree by the powder transport gas, a separate gas supply can be provided for the exclusion fitting itself. Therefore, the use of an exclusion fitting as described above need not impose any particular limitations of the gas supplies provided for operation of the welding torch in the preferred manner. While use of a low pressure torch feed hopper with a plasma transferred arc welding torch is preferred, use of such a feed hopper in accordance with the invention can be used with any heat source including oxy-acetylene and carbon arc torches and gas tungsten arc welding torches, gas metal arc welding torches, as well as plasma torches described above.

Increased gas pressure, however, would compromise the delivery of powdered weld material to the torch and the weld by conventional arrangements. Efforts to improve material delivery by increasing transport gas flow to overcome hydrostatic pressure and frictional forces associated with powder feed line lengths have been found to distort the shape of the weld produced. The known technique of providing powder ports integral with the torch nozzle on opposite sides of the plasma orifice at the center of the nozzle causes the increased gas flow to impinge on the plasma and distort its shape; resulting in the distorted bead described above and in severe cases developing two separated weld beads on either side of the intended weld location.

What we claim is:

1. An underwater welding apparatus for underwater welding under a surface of a body of water, the apparatus comprising:

a first powder supply pressurized with a powder carrier gas positioned above the surface of the body of water;

a second powder supply container positioned below the surface of the body of water and the second powder supply container comprising at least one powder outlet port and a gas vent open to the above surface atmosphere;

at least one powder conduit connecting the first container with the second container;

an underwater welding torch positioned near the second container and having at least one powder inlet;

at least one powder conduit connecting the second powder supply container to the at least one powder inlet of the torch.

2. An underwater welding apparatus for underwater welding under a surface of a body of water, the apparatus comprising:

a plasma transferred arc welding torch adapted for operation underwater and having at least one powder inlet port;

a first powder supply positioned above the surface of a body of water and being connected to a high flow rate source of carrier gas and at least one powder outlet port;

a second powder supply container positioned below the surface of the body of water, the second powder supply container comprising a carrier gas vent open to the atmosphere above the surface of the body of water and at least one powder inlet port and at least one powder outlet port;

powder supply conduits connecting the first container with the second container and the second container to the welding torch.

3. The underwater welding apparatus of claim 2 in which the carrier gas vent is provided with control means positioned above the surface of body of water to control the volume of carrier gas vented to the atmosphere.

4. The apparatus of claim 2 in which the second powder supply container is provided with a plurality of outlet ports communicating with a plurality of powder inlet ports on the torch.

5. The apparatus of claim 3 in which the second powder supply container is provided with 2 powder outlet ports communicating with 2 powder inlet ports on the torch.

6. An underwater welding powder supply container for receiving powder and carrier gas at a high flow rate from a carrier gas pressurized remote source and transferring the powder to a nearby underwater welding torch at a reduced flow rate, the supply container comprising:

a powder chamber, a powder receiving inlet communicating with the powder chamber, at least one powder outlet communicating with the powder chamber and the nearby underwater welding torch, and atmospheric vent means communicating with the powder chamber and the atmosphere.

7. The apparatus of claim 6 in which the supply container is provided with a plurality of outlet ports communicating with a plurality of powder inlet ports on the torch.

8. The apparatus of claim 6 in which the supply container is provided with 2 powder outlet ports communicating with 2 powder inlet ports on the torch.

9. The apparatus of claim 6 in which the atmospheric vent means is provided with control means for controlling the amount of carrier gas vented.

10. A method of underwater welding comprising:

delivering weld filler powder entrained in a carrier gas at a high flow rate from a remote source located above the surface of a body of water to an underwater powder supply container located in proximity to the welding torch; and transferring weld filler powder from the underwater supply container to the torch at a reduced flow rate by venting at least a portion of the carrier gas to the atmosphere above the surface of the body of water.

* * * * *